United States Patent
Matsumura

(10) Patent No.: US 8,186,208 B2
(45) Date of Patent: May 29, 2012

(54) PRESSURE MEASURING MODULE FOR DETECTING AIR PRESSURE WITHIN A TIRE INCLUDED IN A WHEEL ASSEMBLY ATTACHED TO A VEHICLE BODY AND TIRE PRESSURE MONITORING SYSTEM

(75) Inventor: Takafumi Matsumura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 12/366,296

(22) Filed: Feb. 5, 2009

(65) Prior Publication Data
US 2009/0199629 A1 Aug. 13, 2009

(30) Foreign Application Priority Data
Feb. 8, 2008 (JP) ................................. 2008-028994

(51) Int. Cl.
*B60C 23/02* (2006.01)
(52) U.S. Cl. .................. 73/146.4; 73/146; 73/146.5
(58) Field of Classification Search .................. None
See application file for complete search history.

(56) References Cited

U.S. PATENT DOCUMENTS

| | | | |
|---|---|---|---|
| 5,573,611 A * | 11/1996 | Koch et al. ................. | 152/152.1 |
| 6,362,731 B1 * | 3/2002 | Lill ............................. | 340/445 |
| 6,505,507 B1 * | 1/2003 | Imao et al. .................. | 73/146.5 |
| 6,518,876 B1 * | 2/2003 | Marguet et al. ............. | 340/447 |
| 6,518,877 B1 * | 2/2003 | Starkey et al. .............. | 340/447 |
| 6,591,671 B2 * | 7/2003 | Brown ......................... | 73/146.5 |
| 6,710,708 B2 * | 3/2004 | McClelland et al. ......... | 340/442 |
| 6,722,192 B2 * | 4/2004 | Benedict et al. ............. | 73/146 |
| 6,734,791 B2 * | 5/2004 | Kelly et al. .................. | 340/445 |
| 6,903,704 B2 * | 6/2005 | Forster et al. ................ | 343/806 |
| 6,915,229 B2 * | 7/2005 | Taguchi et al. .............. | 702/138 |
| 6,927,680 B2 * | 8/2005 | Kusunoki et al. ............ | 340/442 |
| 7,017,405 B2 * | 3/2006 | Benedict et al. ............. | 73/146.5 |
| 7,079,033 B2 * | 7/2006 | Itou ............................. | 340/572.3 |

(Continued)

FOREIGN PATENT DOCUMENTS
JP    11-173933 A    7/1999
(Continued)

OTHER PUBLICATIONS
European Search Report dated May 18, 2009 (Four (4) pages).
(Continued)

*Primary Examiner* — Lisa Caputo
*Assistant Examiner* — Jermaine Jenkins
(74) *Attorney, Agent, or Firm* — Crowell & Moring LLP

(57) ABSTRACT

The present invention provides a small-sized pressure measuring module suitable for replacement of a tire, and a tire pressure monitoring system. The pressure measuring module detects pressure of air within a tire included in a wheel assembly attached to a vehicle body, and wirelessly transmits data on the detected pressure and a module ID of the pressure measuring module to a pressure monitoring device mounted on the vehicle body. The pressure measuring module has an antenna and an identification code. At least a portion of the antenna protrudes to the outside of the wheel assembly from the surface of a wheel included in the wheel assembly through a through-hole communicating with an inner space of the tire. The antenna wirelessly transmits the detected pressure value and the module ID to the pressure monitoring device. The identifier can be viewed from the outside of the wheel assembly and indicates the module ID.

19 Claims, 14 Drawing Sheets

U.S. PATENT DOCUMENTS

| | | | |
|---|---|---|---|
| 7,091,841 B2 * | 8/2006 | Adamson et al. | 340/447 |
| 7,293,455 B2 * | 11/2007 | Shimura | 73/146 |
| 2003/0227379 A1 | 12/2003 | Itou | |
| 2004/0123654 A1 | 7/2004 | Komatsu et al. | |

FOREIGN PATENT DOCUMENTS

| | | |
|---|---|---|
| JP | 2003-165313 A | 6/2003 |
| JP | 2004-9589 A | 1/2004 |
| JP | 2004-177414 A | 6/2004 |
| JP | 2005-231584 A | 9/2005 |
| JP | 2006-232127 A | 9/2006 |
| JP | 2006-329885 A | 12/2006 |

OTHER PUBLICATIONS

Japanese Office Action including English translation dated May 31, 2010 (Five (5) pages).

* cited by examiner

PRESSURE MEASURING MODULE FOR DETECTING AIR PRESSURE WITHIN A TIRE INCLUDED IN A WHEEL ASSEMBLY ATTACHED TO A VEHICLE BODY AND TIRE PRESSURE MONITORING SYSTEM

BACKGROUND OF THE INVENTION

1. Field of the Invention

The present invention relates to a pressure measuring module for detecting pressure of air within a tire of a vehicle, and a tire pressure monitoring system having the pressure measuring module.

2. Description of the Related Art

It is necessary that pressure of air within a tire of a wheel assembly attached to a car or the like be maintained to a predetermined level (e.g., approximately 220 kPa when the tire is used for a typical car) in order to maintain riding comfort and the fuel efficiency of the vehicle and prevent the tire from being damaged. In recent years, a system (tire pressure monitoring system (TPMS)) for measuring pressure of air within a tire and providing a warning upon a reduction in the pressure has attracted attention. Especially, the US law obliges users to place a TPMS in their vehicles.

Some of TPMSs respectively have a tire pressure measuring module (hereinafter, referred to as a pressure measuring module) attached to each wheel assembly and a pressure monitoring device attached to a vehicle, and are each designed to monitor pressure of air within a tire of each wheel assembly. The TPMSs has two types of information associated with each other: information on identifications that are respectively specific to the modules and transmitted from the modules; and information on the positions of the wheel assemblies to which the modules are respectively attached. The two types of information are registered in the pressure monitoring device. The TPMSs monitors pressure of air within each tire based on the information. In some of those TPMSs used in a process of assembling a vehicle or in a repair shop, dedicated terminal reads the information on the identification of the pressure measuring module from a barcode attached to the wheel assembly, and the pressure monitoring device receives the read identification information through a wired line from the dedicated terminal and registers the received identification information therein (refer to, for example, JP-A-2004-9859).

A pressure measuring module used in such a technique is provided in a tire in many cases. In general, a tire has a wire (bead wire) made of steel, and a wheel is made of metal. The inside of the tire attached to a rim of the wheel is electromagnetically shielded. When the pressure measuring module is provided in the tire, a radio wave transmitted from the pressure measuring module may be affected by the tire and the wheel and attenuated. As a technique for increasing the intensity of a radio wave received by a pressure monitoring device from a pressure measuring module, a receiving antenna of the pressure monitoring device, which is provided near a wheel assembly, has been disclosed (refer to, for example, JP-A-2003-165313).

SUMMARY OF THE INVENTION

The technique disclosed in JP-A-2004-9859 mainly aims at replacement (including replacement of a tire only and replacement of a wheel only) of a wheel assembly in a process of assembling a vehicle or in a repair shop. There are some cases where a user who is an owner of a vehicle replaces a wheel assembly of the vehicle with another wheel assembly. That is, there are some cases where the user regularly replaces the wheel assembly with another one to prevent the tire from being unevenly worn, or replaces a normal tire with a winter tire and vice versa. In those cases, the wheel assembly including a tire and a wheel is replaced with another one while the tire is not removed from the wheel. For example, when a barcode is placed in the tire, it is difficult that a dedicated terminal reads identification information from the barcode without disassembly of the wheel assembly. In addition, JP-A-2004-9859 does not clearly describe the position of a barcode indicating information on the identification of a pressure measuring module. It is therefore necessary to consider the fact that there are some cases where a wheel assembly including a tire and a wheel is replaced with another one while the tire is not removed from the wheel.

In this case, when a plurality of receiving antennas are provided as the technique disclosed in JP-A-2003-165313 in order to increase the intensity of the radio wave received by the pressure monitoring device from the pressure measuring module provided in the tire, the number of parts increases, the number of parts increases, resulting in an increase in the cost. In addition, the weight of the vehicle is increased, and the fuel efficiency of the vehicle is reduced. In another technique to suppress the reduction in the intensity of the radio wave, the intensity of the radio wave transmitted from the pressure measuring module is increased. In this technique, however, it is necessary to increase consumption power in order to increase the intensity of the output radio wave. This results in an increase in the size of a battery that is a power supply for the pressure measuring module. Thus, the weight of the pressure measuring module increases. The weight of a counterweight used to maintain a rotational balance of the wheel assembly increases. This results in a reduction in the fuel efficiency of the vehicle.

An object of the present invention is to provide a small-sized pressure measuring module suitable for replacement of a wheel assembly, and a tire pressure monitoring system.

To accomplish the object, the present invention provides a pressure measuring module for detecting pressure (tire pressure) of air within a tire of a wheel assembly attached to a vehicle body and wirelessly transmitting the detected pressure value and information on an identification of the pressure measuring module to a pressure monitoring device mounted on the vehicle body. The pressure measuring module has an antenna and an identifier. At least a portion of the antenna protrudes to the outside of the wheel assembly from the surface of the wheel of the wheel assembly through a through-hole communicating with an inner space of the tire. The antenna wirelessly transmits the detected tire pressure and the identification information to the pressure monitoring device. The identifier can be viewed from the outside of the wheel assembly and indicates the identification information.

According to the present embodiment, it is easy to read the information on the identification of the pressure measuring module, and the size of the pressure measuring module is reduced. Therefore, replacement of a wheel assembly is easier than that in a conventional technique, and the fuel efficiency of a vehicle can be improved.

DESCRIPTION OF THE PREFERRED EMBODIMENTS

Embodiments of the present invention are described below with reference to the accompanying drawings.

Figure 1:
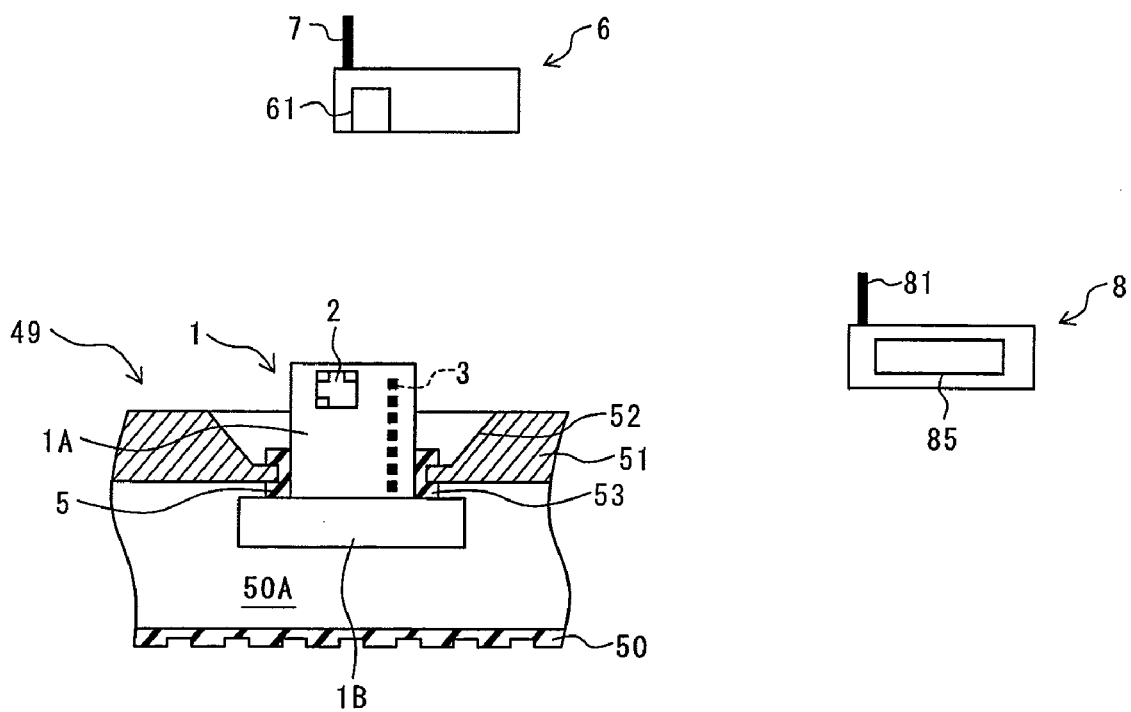
FIG. 1 is a schematic diagram showing a tire pressure monitoring system according to a first embodiment of the present invention.
Figure 2:
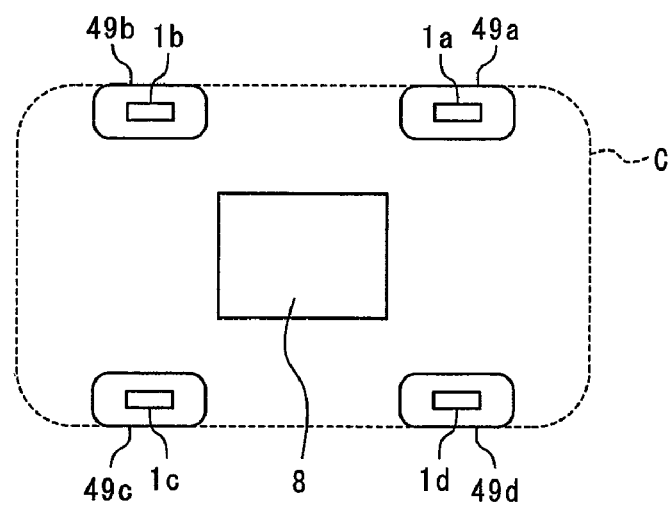
FIG. 2 is a diagram showing the tire pressure monitoring system according to the first embodiment when viewed from a bottom surface of a vehicle.

FIG. 1 is a schematic diagram showing a tire pressure monitoring system according to a first embodiment of the present invention. FIG. 2 is a diagram showing the tire pressure monitoring system according to the first embodiment when viewed from a bottom surface of a vehicle.

The tire pressure monitoring system shown in FIGS. 1 and 2 has tire pressure measuring modules 1 (1a, 1b, 1c and 1d), a tire position setting device 6 and a tire pressure monitoring device 8. The tire pressure measuring modules 1 are attached to respective wheel assemblies 49. The tire pressure monitoring device 8 is attached to a vehicle body C (shown in FIG. 2).

In FIG. 2, the wheel assemblies 49 (49a, 49b, 49c and 49d) are attached to the vehicle body C and respectively located on the front, back, right and left sides of the vehicle body C.

The tire pressure measuring modules (hereinafter, referred to as the pressure measuring modules) 1a, 1b, 1c and 1d are attached to the wheel assemblies 49a, 49b, 49c and 49d, respectively. As shown in FIG. 1, each of the wheel assemblies 49 includes a tire 50 and a wheel 51. A recessed portion 52 is provided on the surface of each of the wheels 51. A through-hole 53 is provided on the bottom surface of each of the recessed portions 52. The through hole 53 is adapted to communicate an inner space 50A (located between the surface of the tire 50 and the wheel 51) of the tire 50 with the surface of the wheel 51.

Each of the pressure measuring modules 1 is designed to detect pressure of air within the inner space 50A and wirelessly transmit the detected pressure value to the tire pressure monitoring device (hereinafter, referred to as the pressure monitoring device) 8. The pressure measuring modules 1 are inserted in the respective through-holes 53 via respective bushes 5. Each of the pressure measuring modules 1 has an antenna unit 1A and a circuit unit 1B.

The circuit units 1B are adapted to detect pressure (hereinafter, referred to as tire pressure) of air within the respective tires. Each of the antenna units 1A is adapted to transmit, to the pressure monitoring device 8, the pressure value detected by the circuit unit 1B, information on the identification of the pressure measuring module 1, and the like. The bush 5 is located between the antenna unit 1A and the through-hole 53. The antenna unit 1A prevents the air from leaking from the tire 50 (the inner space 50A of the tire 50) attached to a rim of the wheel 51. It is preferable that a material of the bushes 5 be rubber. At least a portion of the antenna unit 1A is located in the recessed portion 52. Since the portion of the antenna unit 1A is located in the recessed portion 52, collision of the antenna unit 1A with a foreign object can be suppressed during a movement of the vehicle. This prevents the antenna unit 1A from being damaged. The recessed portion 52 according to the present embodiment is located on the inner circumferential side of the wheel 51 (i.e., the side of a hub of the wheel assembly 49) to efficiently suppress the collision of the antenna unit 1A with the foreign object. The recessed portion 52 according to the present embodiment has a mortar shape to ensure that the diameter of the recessed portion 52 closer to the through-hole 53 is reduced. Since the recessed portion 52 has the mortar shape, a radio wave transmitted by the antenna unit 1A is efficiently diffused.

An identification code 2 is attached to each of the antenna units 1A. In addition, each of the antenna units 1A has an antenna 3 therein.

The identification code 2 is coded information (hereinafter, referred to as a module ID) indicating the identification of the pressure measuring module 1 having the antenna unit 1A to which this identification code is attached. The identification code 2 is an identifier specific to the pressure measuring module 1 having the antenna unit 1A to which this identification code is attached. The module IDs buried in the respective identification codes 2 can be read out by a reading device (tire position setting device 6 in the present embodiment). The identification code 2 is attached to a portion (that protrudes from the surface of the wheel 51) of the antenna unit 1A. That is, each of the identification codes 2 can be viewed from the outside of the wheel assembly 49 by an operator. The identification code 2 according to the present embodiment is attached to a side surface of the antenna unit 1A as shown in FIG. 1. The identification code 2 according to the present embodiment, however, may be attached to another portion of the antenna unit 1A to ensure that the identification code 2 can be viewed from the outside of the wheel assembly 49. For example, the identification code 2 may be attached to an upper surface of the antenna unit 1A. The identification code 2 according to the present embodiment is indicated by an identifier such as a one-dimensional barcode or a two-dimensional barcode.

At least a portion of the antenna 3 is provided in the antenna unit 1A and protrudes to the outside of the wheel assembly 49 through the through-hole 53. Since the portion of the antenna 3 protrudes to the outside of the wheel assembly 49, the antenna 3 can transmit a radio wave from the outside of the wheel assembly 49 composed of the tire 50 and the wheel 51, which are shielding bodies. Specifically, the antenna 3 wirelessly transmits the pressure value detected by the pressure measuring module 1, the module ID, and the like, to the pressure monitoring device 8.

The circuit unit 1B has a pressure sensor 12, a computation and control circuit 18 (that are described later) and the like. The circuit unit 1B is provided in the tire 50. The diameter of the circuit unit 1B according to the present embodiment is larger than that of the antenna unit 1A. The pressure measuring module 1 serves to seal the through-hole 53 by means of the pressure of the air within the tire 50.

Figure 3:
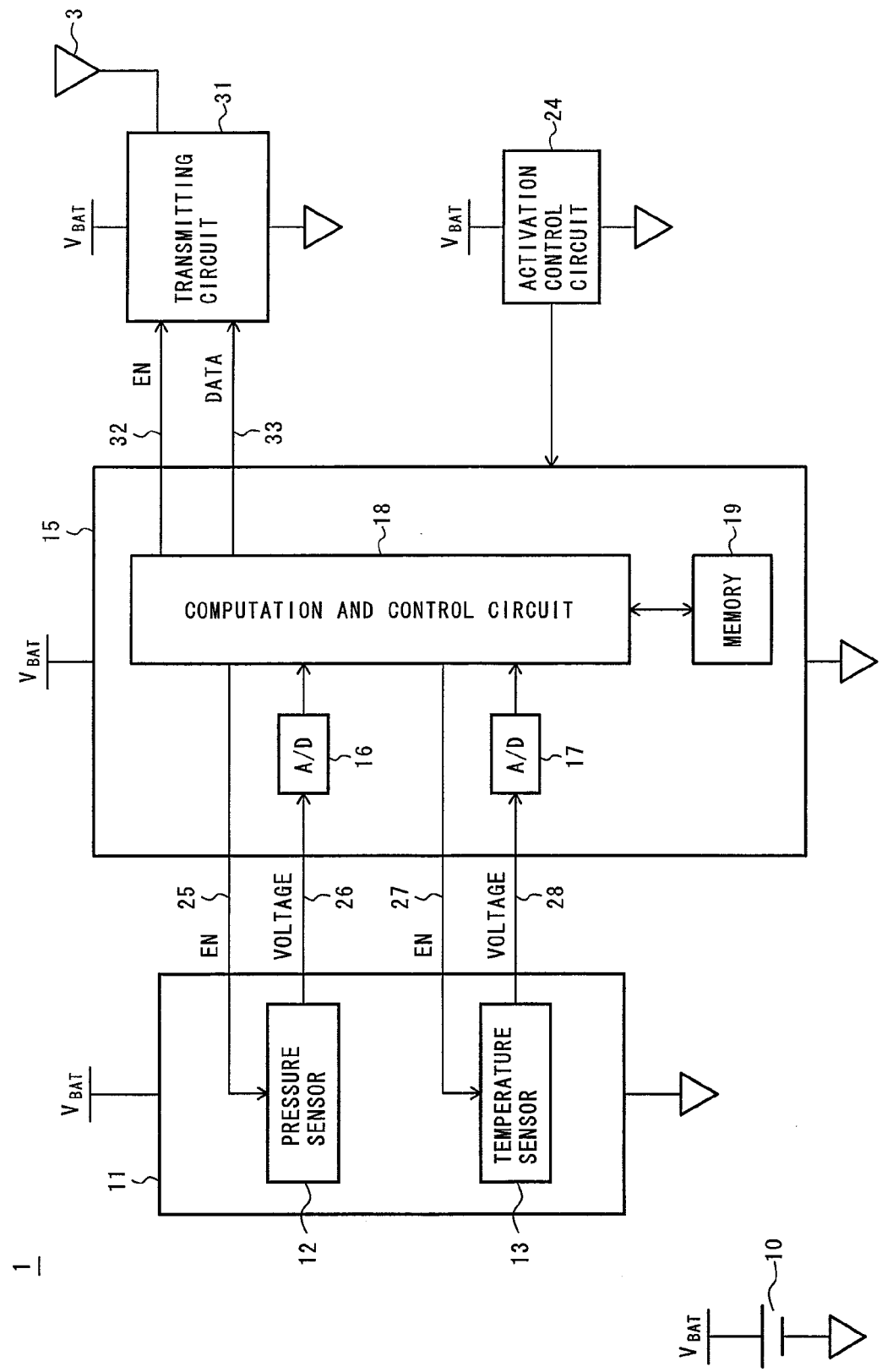
FIG. 3 is a circuit block diagram showing a pressure measuring module according to the first embodiment.

FIG. 3 is a circuit block diagram showing the pressure measuring module 1. In FIG. 3, the same parts as those shown in FIGS. 1 and 2 are indicated by the same reference numerals, and description thereof is omitted (the other drawings are also illustrated in the same manner).

In FIG. 3, the pressure measuring module 1 has a sensor chip 11, a microcomputer 15, a memory 19, an activation control circuit 24, a transmitting circuit 31 and a battery 10.

The sensor chip 11 has a pressure sensor (pressure detector) 12 and a temperature sensor (temperature detector) 13. The pressure sensor 12 detects the pressure of the air within the inner space 50A of the tire 50. The temperature sensor 13 detects the temperature of the air within the inner space 50A.

The microcomputer 15 has the computation and control circuit 18, analog-to-digital converters (A/D converters) 16, 17, and the memory 19.

The computation and control circuit 18 transmits and receives data from the external and performs a calculation, in accordance with a predetermined program. Each of the A/D converters 16 and 17 converts an analog voltage value into a digital value.

The computation and control circuit 18 is connected with the pressure sensor 12 via a control signal line 25, and connected with the temperature sensor 13 via a control signal line 27. The pressure sensor 12 receives an ON signal and an OFF signal from the microcomputer 15 via the control signal line 25, and a power supply for the pressure sensor 12 is turned on and off based on the received ON and OFF signals. The temperature sensor 12 receives an ON signal and an OFF signal from the microcomputer 15 via the control signal line 27, and a power supply for the temperature sensor 13 is turned on and off based on the ON and OFF signals. The pressure sensor 12 is connected with the A/D converter 16 provided in the microcomputer 15 via an output line 26. The temperature sensor 13 is connected with the A/D converter 17 provided in the microcomputer 15 via an output line 28. When the power supply for the pressure sensor 12 is in an ON state by means of the ON signal transmitted from the microcomputer 15, the pressure sensor 12 outputs a voltage corresponding to a pressure value detected by the pressure sensor 12 to the A/D converter 16 via the output line 26. When the power supply for the temperature sensor 12 is in an ON state by means of the ON signal transmitted from the microcomputer 15, the temperature sensor 13 outputs a voltage corresponding to a temperature detected by the pressure sensor 12 to the A/D converter 17 via the output line 28. Each of the A/D converters 16 and 17 converts the output into a digital value and transmits the digital value to the computation and control circuit 18.

The memory 19 stores identification information (module ID) indicating the same identification as the identification code 2 attached to the pressure measuring module 1. The memory 19 is connected with the computation and control circuit 18. In addition, the memory 19 stores correction factors. One of the correction factors is used to correct a variation in the output analog voltage (that varies depending on the sensor chip 11) indicating the pressure detected by the pressure sensor 12. Another of the correction factors is used to correct the output analog voltage (that varies depending on the sensor chip 11) indicating the temperature detected by the temperature sensor 13.

The activation control circuit 24 is designed to activate the microcomputer 15. The activation control circuit 24 is connected with the microcomputer 15 and periodically outputs a pulse to the microcomputer 15. The activation control circuit 24 according to the present embodiment outputs a pulse to the microcomputer 15 at intervals of 10 seconds.

The transmitting circuit 31 is designed to wirelessly transmit, to the pressure monitoring device 8, data such as the module ID stored in the memory 19 and a measurement value (the pressure and temperature of the air within the inner space 50A of the tire 50) calculated (corrected) by the microcomputer 15. The transmitting circuit 31 is connected with the computation and control circuit 18 via digital output terminals 32 and 33. The transmitting circuit 31 modulates (for example, amplitude shift keying (ASK) modulation or frequency shift keying (FSK) modulation) a carrier wave by means of a data signal input to a modulation input terminal of the transmitting circuit 31 from a digital output terminal 33 of the microcomputer 15 to perform communications. The carrier wave transmitted from the transmitting circuit 31 has a frequency (for example, 315 MHz) in a range of the UHF band. The transmitting circuit 31 is connected with the antenna 3.

The battery 10 is used to supply power (voltage VBAT) to the entire pressure measuring module 1. In the present embodiment, a coin-shaped lithium battery (nominal voltage of 3 V) is used as the battery 10.

Figure 4:
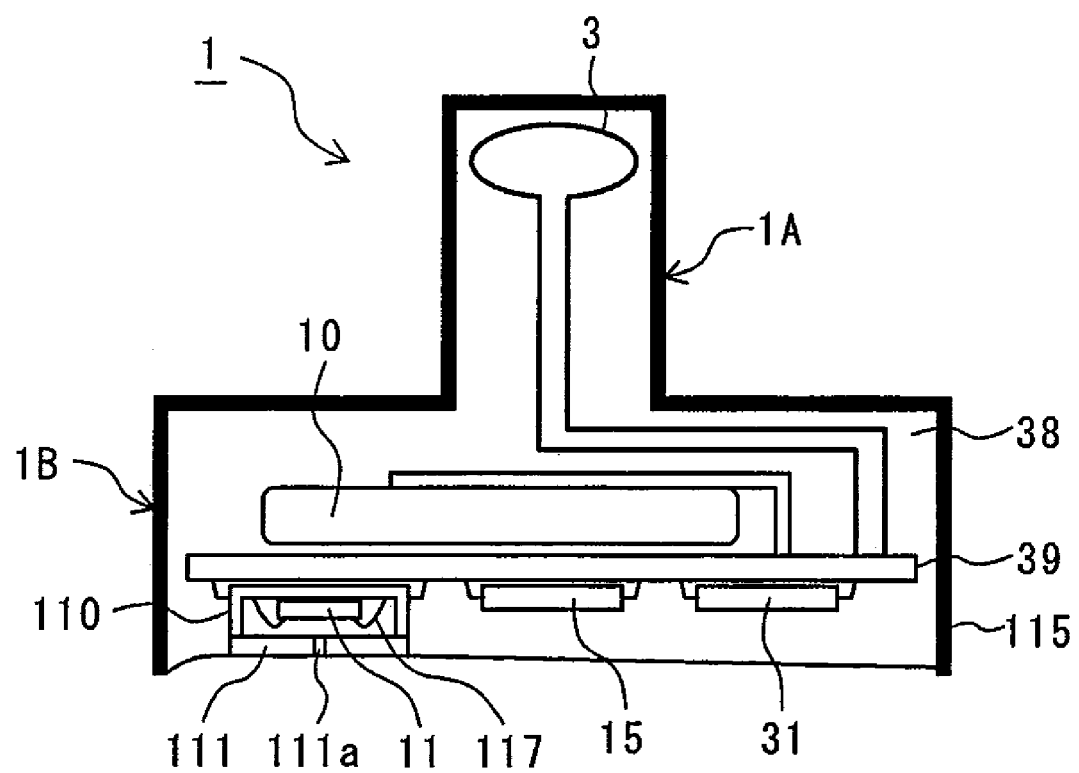
FIG. 4 is a cross sectional view of the pressure measuring module shown in FIG. 1.

FIG. 4 is a cross sectional view of the pressure measuring module 1 shown in FIG. 1.

As shown in FIG. 4, the microcomputer 15, the transmitting circuit 31, the battery 10, the antenna 3 and a sensor chip case 110 are attached to a substrate 39. The substrate 39 is provided in the circuit unit 1B.

The substrate 39 is inserted in a module case 115 and fixed to an epoxy resin 38 filled in the module case 115. Therefore, even when a centrifugal force acts due to rotation of the wheel assembly 49, each electronic part can be held on the substrate 39.

The sensor chip 11 adheres to the sensor chip case 110 and is located in the sensor chip case 110. The sensor chip 11 is electrically connected with the substrate 39 via a wire 117. A cover 111 adheres to the sensor chip case 110 and has a pressure hole that communicates with the inner space 50A. The pressure of the air within the tire is applied to the sensor chip 11 via the pressure hole 111a.

The antenna 3 is provided in the module case 115 and extends from the substrate (that is fixed to the circuit unit 1B) through the circuit unit 1B to the antenna unit 1A.

Figure 5:
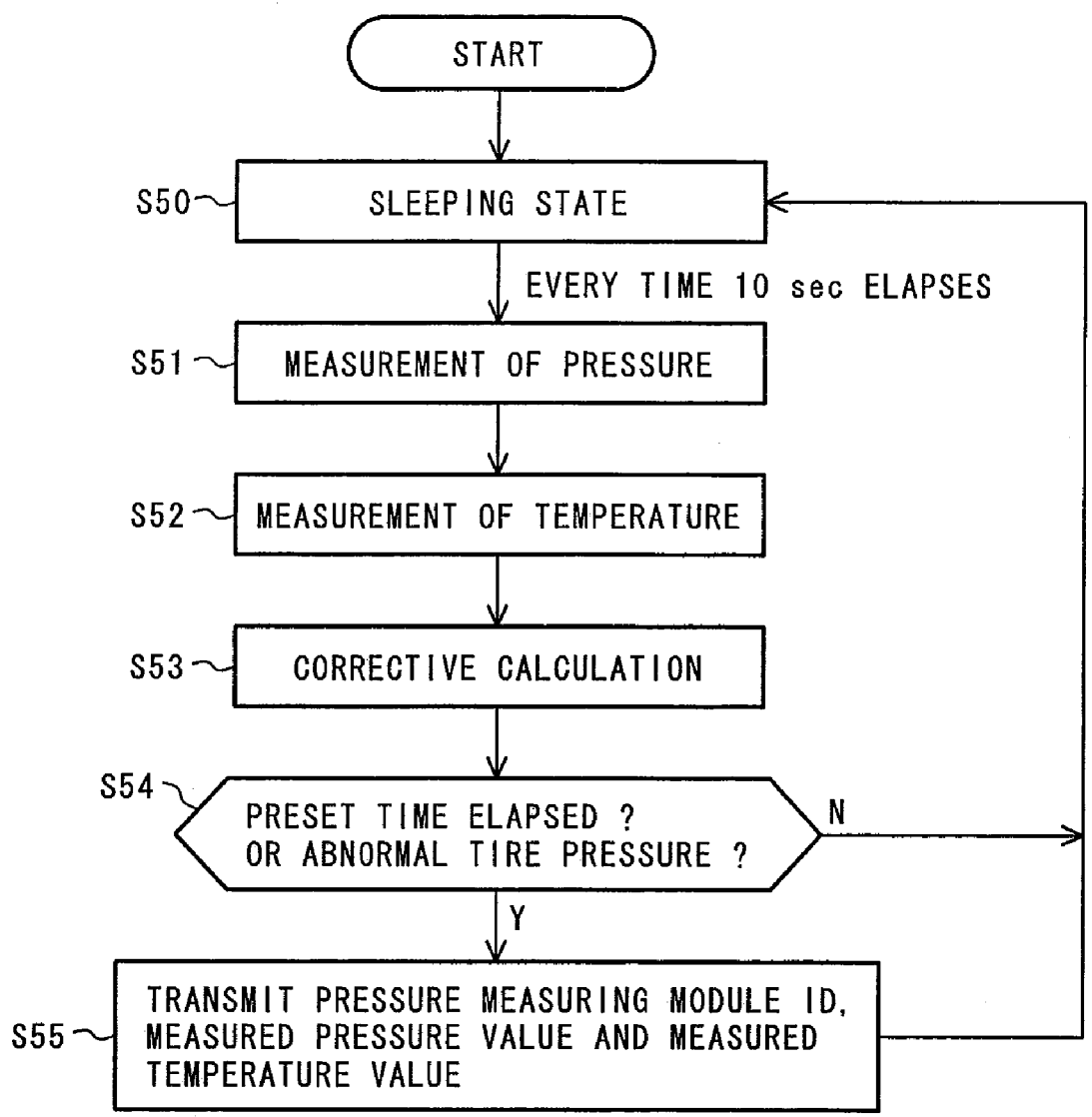
FIG. 5 is a flowchart showing an example of operations of the pressure measuring module according to the first embodiment.

FIG. 5 is a flowchart showing an example of operations of pressure measuring module 1.

As shown in FIG. 5, the pressure measuring module 1 is first in a sleeping state in step S50.

When the microcomputer 15 is activated by the pulse transmitted from the activation control circuit 24, the microcomputer 15 turns on the power supply for the pressure sensor 12. The pressure sensor 12 activated by the microcomputer 15 measures the pressure of the air within the inner space 50A of the tire 50 in step S51 and outputs a voltage corresponding to the measured pressure value to the A/D converter 16. The microcomputer 15 causes the A/D converter 16 to convert the voltage value output from the pressure sensor 12 into a digital value and transmit the digital value to the computation and control circuit 18. After the A/D converter converts the voltage value output from the pressure sensor 12 into the digital value, the microcomputer 15 turns off the power supply for the pressure sensor 12.

In addition, the microcomputer 15 turns on the power supply for the temperature sensor 13. The temperature sensor 13 activated by the microcomputer 15 measures the temperature of the air within the inner space 50A of the tire 50 in step S52 and outputs a voltage corresponding to the measured temperature to the A/D converter 17. The microcomputer 15 causes the A/D converter 17 to convert the voltage value output from the temperature sensor 13 into a digital value and transmit the digital value to the computation and control circuit 18. After the A/D converter 17 converts the voltage value output from the temperature sensor 13 into the digital value, the microcomputer 15 turns off the power supply for the temperature sensor 13. Although step S51 is performed before step S52 in the present embodiment, step S52 may be performed before step S51.

Next, the computation and control circuit 18 provided in the microcomputer 15 reads the correction factors from the memory 19 and uses the correction factors to correct the voltage output from the pressure sensor 12 and the voltage output from the temperature sensor 13 in step S53. Then, the computation and control circuit 18 confirms whether or not the pressure of the air within the inner place 50A of the tire 50 is in a normal range (whether or not the pressure is abnormally reduced) based on the corrected voltage values in step S54. Every time the microcomputer 15 is activated a predetermined number of times (6 times in the present embodiment (i.e., every 60 seconds)), or when the pressure of the air within the inner space 50A of the tire 50 is not in the normal range, the computation and control circuit 18 transmits the module ID, the measured pressure value and the measured temperature value to the transmitting circuit 31. The transmitting circuit 31 receives the module ID, the measured temperature value and the measured temperature value and wirelessly transmits them to the pressure monitoring device 8 in step S55. After step S55 is completed, or when the process does not proceed from step S54 to step S55, the process returns to step S50 to ensure that the pressure measuring module 1 becomes in the sleeping state. Then, the pressure measuring module 1 repeats the operations in the subsequent steps S51 to S55.

Returning back to FIG. 1, a tire position setting device (hereinafter, referred to as a position setting device) is designed to wirelessly transmit the module ID of each pressure measuring module 1 and positional information on the position of each pressure measuring module 1 to the pressure monitoring device 8 and registers the module IDs and the positional information therein. The position setting device 6 has an identification code reader 61, an input unit 62 (shown in FIG. 6) and a display unit 64 (shown in FIG. 6).

The identification code reader (hereinafter, referred to as a reader) 61 is designed to read the module ID from the identifier (identification code 2) attached to the pressure measuring module 1. The reader 61 according to the present embodiment is a code reader for optically reading the identification code 2 attached to the pressure measuring module 1. For example, when the identification code 2 is a barcode, and the reader 61 is placed above the identification code 2, the reader 61 can read the module ID.

The input unit 62 is used by the operator to enter information on the position of the pressure measuring module 1 having the module ID read by the reader 61. The input unit 62 has switches 62a, 62b and 62c (shown in FIG. 6).

An antenna 7 is designed to wirelessly transmit, to the pressure monitoring device 8, a control signal (trigger signal) and data (the module ID of each pressure measuring module 1, the positional information and the like) acquired by the position setting device 6 by means of a radio wave.

Figure 6:
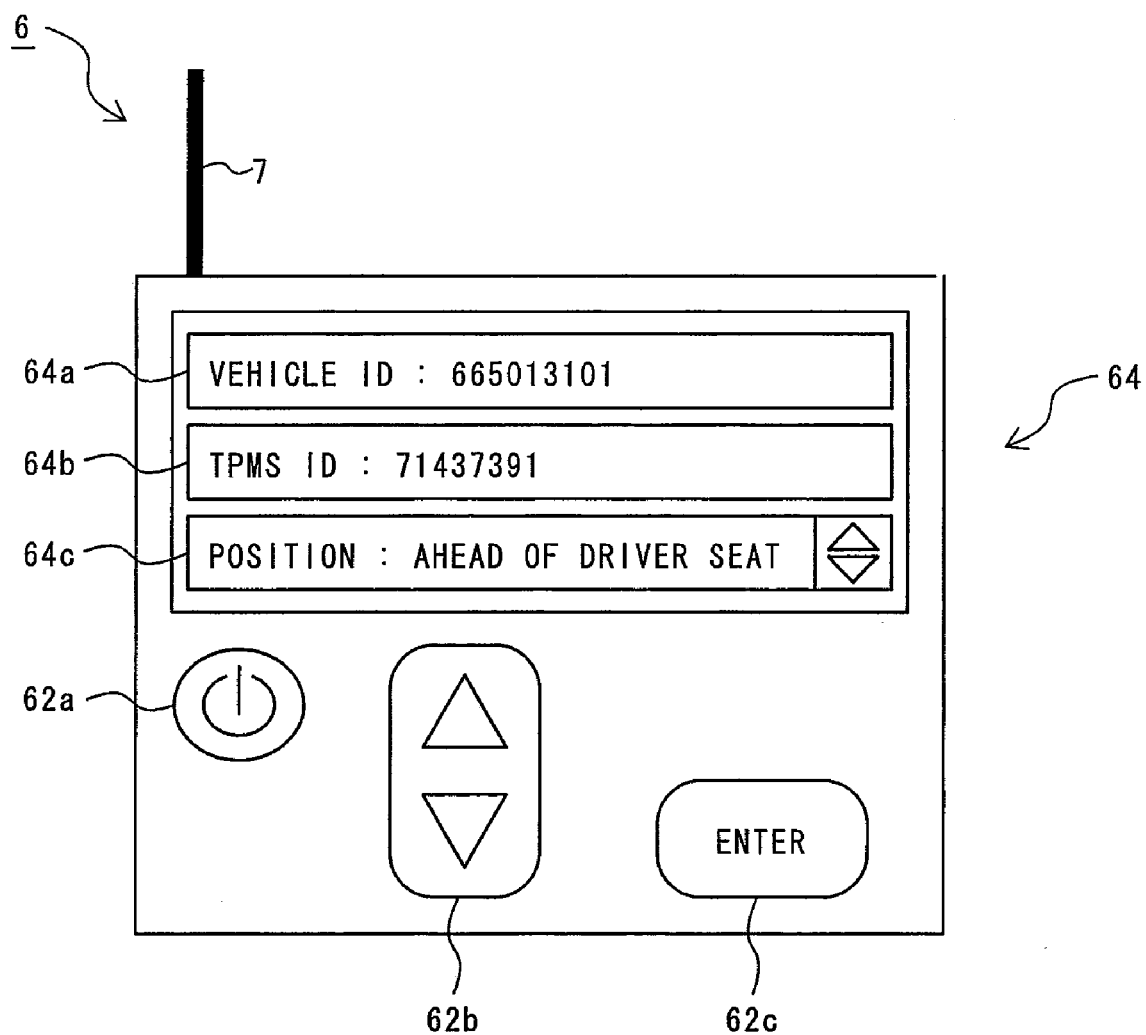
FIG. 6 is a diagram showing the appearance of a position setting device according to the first embodiment.

FIG. 6 is a diagram showing the appearance of the position setting device 6.

The position setting device 6 has a power switch 62a, an up-down switch 62b, a set switch 62c and the display unit 64. The power switch 62a is used to turn on and off a power supply for the position setting device 6. The up-down switch 62b is used to select any of items displayed by the display unit 64. The set switch 62c is used to set the item selected by the up-down switch 62b.

The display unit 64 has a vehicle ID display section 64a, a module ID display section 64b and a wheel assembly position display section 64c. The vehicle ID display section 64a displays information (vehicle ID) on an identification of a vehicle that transmits the module ID of the pressure measuring module 1 and the information on the position of the pressure measuring module 1. In order to set a vehicle, a desired vehicle ID (of the vehicle) is selected by using the up-down switch 62b and is set by using the set switch 62c. The module ID display section 64b displays the module ID (of the pressure measuring module 1) read by the reader 61. The wheel assembly display section 64c displays information on the position of the pressure measuring module 1. In the present embodiment, the position of the pressure measuring module 1, which corresponds to the position of the wheel assembly 49, is displayed. In order to set the position of the pressure measuring module 1 having the read module ID, a desired position is selected by using the up-down switch 62b and set by using the set switch 62c.

Figure 7:
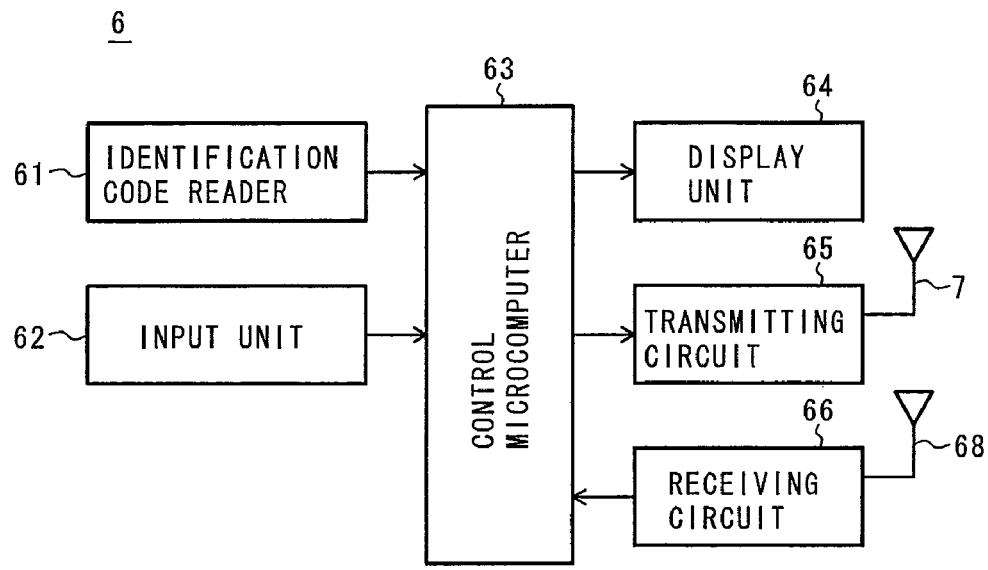
FIG. 7 is a circuit block diagram showing the position setting device according to the first embodiment.

FIG. 7 is a circuit block diagram showing the position setting device 6.

The position setting device 6 has the reader 61, the input unit 62, a control microcomputer 63, the display unit 64, a transmitting circuit 65 and a receiving circuit 66. The control microcomputer 63 is connected with the reader 61, the input unit 62, the display unit 64, the transmitting circuit 65 and the receiving circuit 66.

The transmitting circuit 65 is designed to wirelessly transmit data to a vehicle (pressure monitoring device 8) set by using the vehicle ID display section 64a. The transmitting circuit 65 is connected to the antenna 7. The data transmitted by the transmitting circuit 65 is the module ID of each pressure measuring module 1; the information on the position of each pressure measuring module 1; the vehicle ID of the vehicle mounting the pressure monitoring device 8 that is a destination of the data; a trigger signal (described later) indicating a request for transmission of the vehicle ID to the pressure monitoring device 8; or the like.

The frequency of a radio wave transmitted by the transmitting circuit 65 according to the present embodiment is the same as the frequency (UHF band (e.g., 315 MHz)) of the carrier wave transmitted by the transmitting circuit 31 of the pressure measuring module 1. Since the frequency of the radio wave transmitted by the transmitting circuit 65 is the same as the frequency of the carrier wave transmitted by the transmitting circuit 31, a single receiving circuit (i.e., a receiving circuit 82 described later) provided in the pressure monitoring device 8 can receive signals from both the pressure measuring module 1 and the position setting device 6. This simplifies the configuration of the pressure monitoring device 8.

The receiving circuit 66 is designed to wirelessly receive data (such as the vehicle ID, a receipt acknowledgement signal, and a control signal) from the pressure monitoring device 8 and transmit the data to the control microcomputer 63. The frequency of the radio wave received by the receiving circuit 66 is in the range of the LF band (for example, 125 kHz). The radio wave received by the receiving circuit 66 is subjected to the ASK modulation. The receiving circuit 66 is connected with an antenna 68. The frequency of the radio wave received by the receiving circuit 66 and the modulation scheme used by the receiving circuit 66 may be the same as the frequency (UHF band (e.g., 315 MHz)) of the radio wave transmitted by the transmitting circuit 31 of the pressure measuring module 1 and the modulation scheme used by the transmitting circuit 31 of the pressure measuring module 1, respectively. In this case, the data transmitted from the pressure measuring module 1 can be confirmed.

Returning back to FIG. 1 again, the pressure monitoring device 8 is designed to associate pressure detected by the pressure measuring modules 1 (attached to the wheel assemblies 49 of the vehicle mounting this pressure monitoring device 8) with the positional information on the position of each of the pressure measuring modules 1 and monitor the detected pressure values based on the module IDs. The pressure monitoring device 8 receives the module ID of each pressure measuring module 1 and the information on the position of each pressure measuring module 1 from the position setting device 6. The pressure monitoring device 8 then associates the module ID of each pressure measuring module 1 with the information on the position of each pressure measuring module 1. The pressure monitoring device 8 then stores the module IDs and the positional information therein. Each pressure measuring module 1 transmits, to the pressure monitoring device 8, the module ID and the detected pressure value at an appropriate timing. The pressure monitoring device 8 uses the stored module IDs (of the pressure measuring modules attached to the respective wheel assemblies of the vehicle mounting this pressure monitoring device 8), the stored positional information (on the positions of the pressure measuring modules attached to the respective wheel assemblies of the vehicle mounting this pressure monitoring device 8), the module IDs (of the pressure measuring modules 1) transmitted by the pressure measuring modules 1, and the pressure values transmitted by the pressure measuring modules 1, selects the data transmitted from the pressure measuring modules 1 (attached to the respective wheel assemblies of the vehicle mounting this pressure monitoring device 8) based on the stored module IDs, associates the pressure value detected by each pressure measuring module 1 (attached to the respective wheel assemblies of the vehicle mounting this pressure monitoring device 8) with the stored positional information, and monitors the pressure values. The pressure monitoring device 8 shown in FIG. 1 has a display unit 85 and an antenna 81.

The display unit 85 displays the pressure value of the air within the tire of each wheel assembly 49a, 49b, 49c and 49d. In the present embodiment, when the pressure of the air within the tire of each wheel assembly 49a, 49b, 49c and 49d is not in the normal range, a caution or warning indicating the abnormality of the pressure value, information on the position of the abnormal wheel assembly, and the pressure value are displayed.

The antenna 81 receives the data from each pressure measuring module 1. In addition, the antenna 81 receives the data, the control signal and the like from the position setting device 6.

Figure 8:
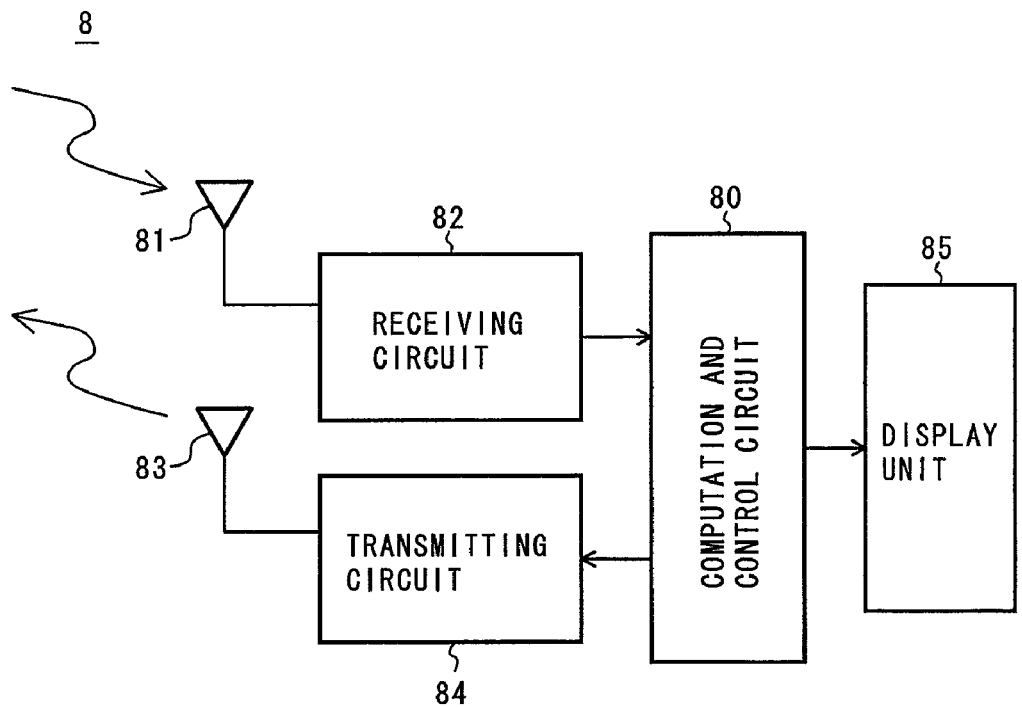
FIG. 8 is a circuit block diagram showing a pressure monitoring device according to the first embodiment.

FIG. 8 is a circuit block diagram showing the pressure monitoring device 8.

The pressure monitoring device 8 shown in FIG. 8 has a computation and control circuit 80, a receiving circuit 82, a transmitting circuit 84 and a display unit 85. The receiving circuit 82 is connected with the antenna 81. The transmitting circuit 84 is connected with an antenna 83.

The computation and control circuit 80 is designed to transmit and receive data and perform a calculation. Specifically, the computation and control circuit 80 monitors the pressure of the air within the tire of each wheel assembly 49 based on the module ID of each pressure measuring module 1, the information on the position of each pressure measuring module 1 and the pressure value detected by each pressure measuring module 1. In addition, the computation and control circuit 80 transmits the identification information (vehicle ID) on the identification of the vehicle mounting the pressure measuring modules 1 and an acknowledgement signal (receipt acknowledgement signal) indicating that the receiving circuit 82 receives the data from the position setting device 6.

The receiving circuit 82 is designed to receive the module ID and the pressure value from each measuring module 1. In addition, the receiving circuit 82 is designed to receive the module ID, the information on the position of the pressure measuring module 1 having the module ID, the vehicle ID, the trigger signal and the like from the position setting device 6.

The transmitting circuit 84 is designed to transmit the vehicle ID, a receipt acknowledgement signal and the like to the position setting device 6.

When a plurality of vehicles are placed in a small area, a plurality of the pressure monitoring devices 8 may simultaneously transmit the vehicle IDs, and signals to be received by the position setting devices 6 may interfere with each other. To avoid this, it is preferable that the pressure monitoring device 8 receive a trigger signal and then transmit the vehicle ID after a certain delay time from the reception of the trigger signal or after a delay time varying depending on the intensity of the received trigger signal. In addition, it is preferable that when it is determined that another one of the plurality of pressure monitoring devices 8 is the process of transmitting a vehicle ID based on information received by the receiving circuit 82, the pressure monitoring device 8 delays the transmission of the vehicle ID. This configuration allows the pressure monitoring device 8 to reliably transmit the vehicle ID to the position setting device 6.

Power required for operations of the pressure monitoring device 8 is supplied from a battery (not shown) provided in the vehicle body C.

Next, a description will be made of a process of setting the position of the wheel assembly to which the pressure measuring module 1 is attached in the tire pressure monitoring system having the abovementioned configuration.

Figure 9:
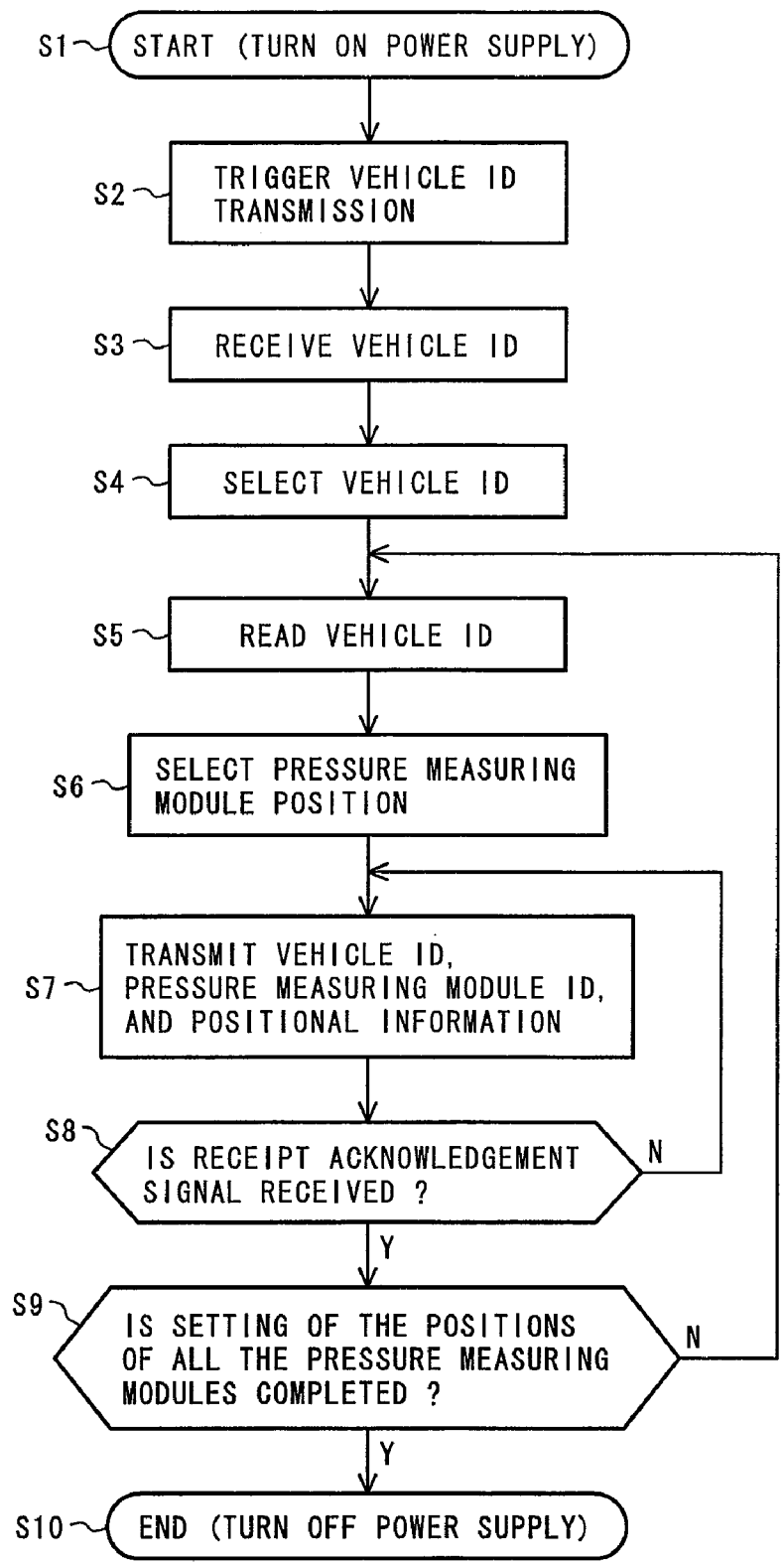
FIG. 9 is a flowchart showing an example of a process of setting the position of the pressure measuring module according to the first embodiment.

FIG. 9 is a flowchart showing an example of the process of setting the position of each pressure measuring module 1.

In order to set the position of each pressure measuring module 1, an operator presses the power switch 62a of the position setting device 6 to turn on the power supply in step S1.

The activated position setting device 6 wirelessly transmits, to the pressure monitoring device 8, a trigger signal indicating a request for transmission of the vehicle ID (or information on the identification of the pressure monitoring device 8) in step S2. The pressure monitoring device 8 receives the trigger signal and transmits the vehicle ID to the position setting device 6 in response to the trigger signal. The position setting device 6 receives the vehicle ID from the pressure monitoring device 8 in step S3. When a plurality of vehicles are placed in a small area, a plurality of vehicle IDs transmitted from the pressure monitoring devices 8 are displayed by the display unit 64a of the position setting device 6. The operator uses the up-down switch 62b and the set switch 62c to select and set the vehicle ID to be subjected to the process of setting the position of the pressure measuring module 1 in step S4. In order to select a desired one of the vehicle IDs, the vehicle IDs may be displayed by the display unit 64a in the order of the intensities of radio waves received by the position setting device 6. In this case, the vehicle ID of the vehicle that is estimated to be close to the position setting device 6 is displayed at a high rank. It is possible to easily select the vehicle ID of the vehicle close to the operator.

Next, the reader 61 of the position setting device 6 is used to read the identification code 2 attached to the pressure measuring module 1 in step S5. When the reader 61 reads the identification code 2, the read module ID is displayed by the display unit 64a of the position setting device 6. Then, the operator uses the up-down switch 62b and the set switch 62c to select and set the wheel assembly 49 to which the pressure measuring module 1 having the read identification code 2 attached thereto is attached in step S6.

Next, in step S7, the operator uses the position setting device 6 to wirelessly transmit, to the pressure monitoring device 8, the vehicle ID selected in step S3, the module ID acquired in step S5 and the information (on the position of the pressure measuring module 1) set in step S6. The pressure monitoring device 8 receives the abovementioned data. Then, the pressure monitoring device 8 compares the vehicle ID received from the position setting device 6 with the vehicle ID of the vehicle mounting the pressure monitoring device 8, and confirms whether or not both of the vehicle IDs match each other. When the vehicle IDs match each other, the position of the pressure measuring module 1 is reset based on the module ID and the positional information that are transmitted from the position setting device 6. As an example of the configuration in which data is transmitted from the position setting device 6 to the pressure monitoring device 8, a confirmation message indicating data transmission is displayed by the display unit 64, and data is transmitted from the position setting device 6 to the pressure monitoring device 8 when the operator presses the set switch 62c.

When the pressure monitoring device 8 receives the abovementioned data from the position setting device 6, the pressure monitoring device 8 wirelessly transmits a signal (receipt acknowledgement signal) to the position setting device 6 through the transmitting circuit 84 to inform the position setting device 6 of the reception of the data. When the position setting device 6 confirms reception of the receipt acknowledgement signal in step S8, the position setting device 6 confirms whether or not operations for setting the positions of all the pressure measuring modules 1 are completed in step S9. When the position setting device 6 confirms that the operations for setting the positions of all the pressure measuring modules 1 are completed, the operator presses the switch 62a to turn off the power supply for the position setting device 6 and terminate the operations for setting the positions in step S10. After the operations for setting the positions of all the pressure measuring modules 1 are completed, and after the wheel assembly is replaced, the pressure monitoring device 8 can monitor the pressure of air within the tire of each wheel assembly 49.

When the position setting device 6 cannot confirm the reception of the receipt acknowledgement signal in step S8, the process returns back to step S7 and the position setting device 6 causes the display unit 64 to display the fact that the position setting device 6 cannot confirm the reception of the receipt acknowledgement signal in order to prompt the operator to use the position setting device 6 to ensure that the position setting device 6 retransmits the data transmitted in step S7. If the operations for setting the positions of all the pressure measuring modules 1 are not completed in step S9, the process returns back to step S5 and the position setting device 6 causes the display unit 64 to display the fact that the operation for setting the position of another pressure measuring module 1 is performed.

Next, an effect of the present embodiment will be described.

In the present embodiment described above, the identification code 2 attached to the pressure measuring module 1 is positioned to ensure that the identification code 2 can be viewed from the outside of the wheel assembly 49. Even when a user regularly changes the wheel assembly or changes a normal tire from a winter tire or vice versa, it is possible to easily read the module ID without removal of the tire from the wheel assembly and disassembly of the wheel assembly. Therefore, even when the wheel assembly is changed without the removal of the tire from the wheel assembly, it is possible to easily reset the module ID after the change of the wheel assembly.

In the present embodiment, since at least the portion of the antenna 3 of the pressure measuring module 1 protrudes outside of the wheel assembly 49, a radio wave does not attenuate due to the presence of a portion of the antenna 3 in the inner space 50A of the tire 50 when the radio wave passes through the tire 50. This makes it possible to reduce the intensity of the radio wave output from the pressure measuring module 1, compared with the case where the antenna 3 is provided in the inner space 50A of the tire 50. Thus, power consumed by the pressure measuring module 1 can be reduced, the capacity of the battery can be reduced, and the size and weight of the battery can be reduced. In addition, the size and weight of the pressure measuring module 1 can be reduced. The weight of the vehicle and the weight of the counterweight can be reduced, resulting in an improvement in the fuel efficiency of the vehicle. When the size and weight of the battery do not need to be reduced, the lifetime of the battery can be increased.

According to present embodiment described above, it is possible to easily read the module ID, and the size of the pressure measuring module 1 is reduced. The replacement of the wheel assembly can be simplified, and the fuel efficiency of the vehicle can be improved.

In general, the pressure measuring module is attached to the wheel assembly that is a rotational body. It is therefore difficult that the pressure measuring module receives power supply from the external. The pressure measuring module has a battery therein in many cases. Since a vehicle is used for a long time (e.g., approximately 10 years), it is necessary to replace a pressure measuring module with another one in some cases when a battery is completely discharged. In this case, when an identification code is attached to a part (e.g., tire or wheel) other than the pressure measuring module, it is necessary to perform an operation for matching a module ID stored in the pressure measuring module with a module ID stored in the identification code. On the other hand, since the identification code 2 is attached to the pressure measuring module 1 according to the present embodiment, it is not necessary to reset the module ID after the pressure measuring module 1 is replaced with another one. Therefore, the wheel assembly can be quickly replaced with another one.

In addition, since a plurality of vehicles are present near the position setting device 6 in a vehicle assembly process and a repair shop, the position setting device 6 and the pressure monitoring device 8 are connected to each other through a wired line in many cases in order to avoid erroneous transmission of data acquired by the position setting device 6 and erroneous registration of the data acquired by the position setting device 6. In order to connect the position setting device 6 with the pressure monitoring device 8 through the wired line, it may take an effort to perform the connection work, or a connection terminal may become tainted by a tire cleaner, oil or the like during the connection work, resulting in impossibility to perform communications. On the other hand, in the present embodiment, the vehicle ID is received by the position setting device 6 from the pressure monitoring device 8 (that transmits data) in advance, the position setting device 6 wirelessly transmits the received vehicle ID and other data. The position setting device 6 registers the received data therein only when the vehicle ID received by the pressure monitoring device 8 and the vehicle ID of the vehicle mounting the pressure monitoring device 8 match each other. Therefore, even when data acquired by the position setting device 6 is wirelessly transmitted, the pressure monitoring device 8 does not erroneously register the data therein. This improves the efficiency of the operation for resetting the module ID. In the present embodiment, when the pressure monitoring device 8 does not transmit the receipt acknowledgement signal, retransmission operations (in steps S7 and S8 shown in FIG. 9) are performed. Therefore, in the present embodiment, even when a plurality of the position setting devices 6 wirelessly transmit signals simultaneously and interference between the signals occurs, it is possible to reliably reset the position of each pressure measuring module 1.

Before the position of each pressure measuring module 1 is reset, the position setting device 6 updates the module ID (of each pressure measuring module 1) stored in the pressure monitoring device 8 and the information (on the position of each pressure measuring module 1) stored in the pressure monitoring device 8. The module ID stored in the memory 19 of each pressure measuring module 1 is not updated. It is therefore not necessary that data required for data update be not transmitted to each pressure measuring module 1. It is not necessary that each pressure measuring module 1 have a receiving circuit. The size and weight of each pressure measuring module 1 can be reduced, compared with the case where the module ID stored in each pressure measuring module 1 is updated. The reduction in the weight of the vehicle having the pressure measuring modules 1 makes it possible to improve the fuel efficiency of the vehicle.

The configuration described above may be modified as described below.

Figure 10:
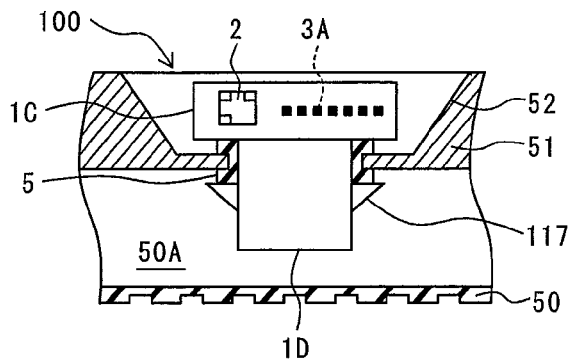
FIG. 10 is a diagram showing a first modification of the pressure measuring module according to the first embodiment.
Figure 11:
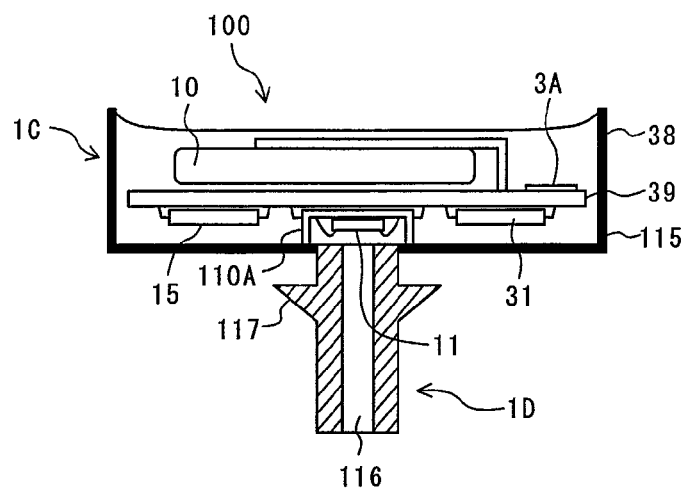
FIG. 11 is a cross sectional view of the pressure measuring module shown in FIG. 10.
Figure 12:
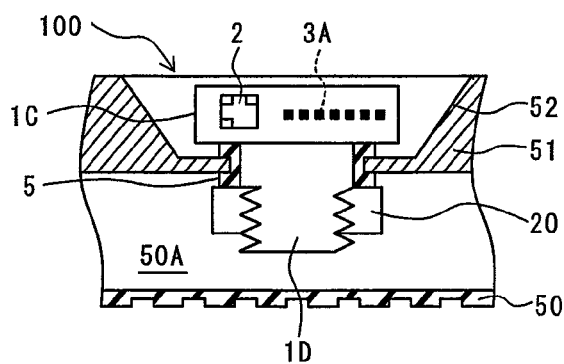
FIG. 12 is a diagram showing a second modification of the pressure measuring module according to the first embodiment.

FIG. 10 is a diagram showing a modification of the pressure measuring module according to the present embodiment. FIG. 11 is a cross sectional view of the modified pressure measuring module.

The modified pressure measuring module 100 shown in FIGS. 10 and 11 has an antenna circuit unit 1C and a pressure application unit 1D. The antenna circuit unit 1C has an antenna 3A and a circuit. The pressure application unit 1D applies the pressure of the air within the tire 50 to the antenna circuit unit 1C. The antenna circuit unit 1C is provided in the recessed portion 52 of the wheel 51. The pressure application unit 1D is provided in the tire 50.

As shown in FIG. 11, the antenna circuit unit 1C also has a sensor chip case 110A. The antenna 3A provided in the antenna circuit unit 1C is attached to the substrate 39. The antenna 3A is, for example, printed on the substrate 39 (the antenna 3A is formed by printing a copper foil pattern on the substrate 39). The battery 10 is provided above the substrate 39 (on the side of the hub of the wheel assembly 49).

The pressure application unit 1D has a pressure hole 116 and a claw 117, and adheres to the module case 115 on the side of the tire 50 with respect to the sensor chip case 110A. The diameter of the pressure application unit 1D is smaller than the diameter of the antenna circuit unit 1C. The pressure measuring module 100 is inserted into the through-hole 53 from the wheel 51 and fixed to the wheel 51. The claw 117 serves to prevent the pressure measuring module 100 from being removed from the through-hole 53. The pressure hole 116 is used to apply the pressure of the air within the tire 50 to a sensor chip 11 provided in the sensor chip case 110A.

As described above, since the antenna circuit unit 1C is provided in the recessed portion 52, it is not necessary that the antenna 3A protrude outside of the wheel 51. It is therefore possible to print the antenna 3A on the substrate 39. This makes it possible to reduce the thickness of the antenna circuit unit 1C. The size of the module, and the number of parts required for the module can be reduced. In addition, since the thickness of the antenna circuit unit 1C can be reduced, the pressure measuring module 100 can be easily placed in the recessed portion 52. As shown in FIG. 10, since an end portion (located on the side of the wheel 51) of the antenna circuit unit 1C is located in the recessed portion 52, it is possible to reduce the possibility that the antenna is damaged due to collision with a foreign object.

As shown in FIG. 11, since the battery 10 is located in the pressure measuring module 100 and on the side of the wheel 51, the battery 10 can be easily replaced.

Although the antenna 3A is printed on the substrate 39, the antenna 3A may have a structure in which the antenna 3A can extend upward from the substrate 39 as shown in the example of FIGS. 1 and 3.

In addition, although the claw 117 is provided to fix the pressure measuring module 100 to the wheel 51, a groove may be provided in the pressure application unit 1D and a nut may be provided in the inner space 50A of the tire 50, and the groove and the nut may be coupled with each other to fix the pressure measuring module 100 to the wheel 51.

The above description provides the example in which the identification code 2 is used as the identifier indicating the information on the identification of the pressure measuring module 1. However, a small-sized, lightweight IC tag may be used as the identifier. The IC tag does not require a power supply and an external antenna.

Figure 13:
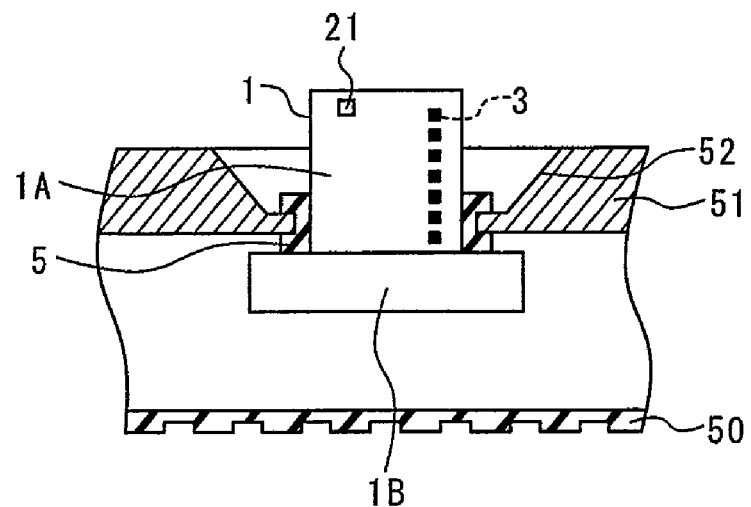
FIG. 13 is a diagram showing a third modification of the pressure measuring module according to the first embodiment.
Figure 14:
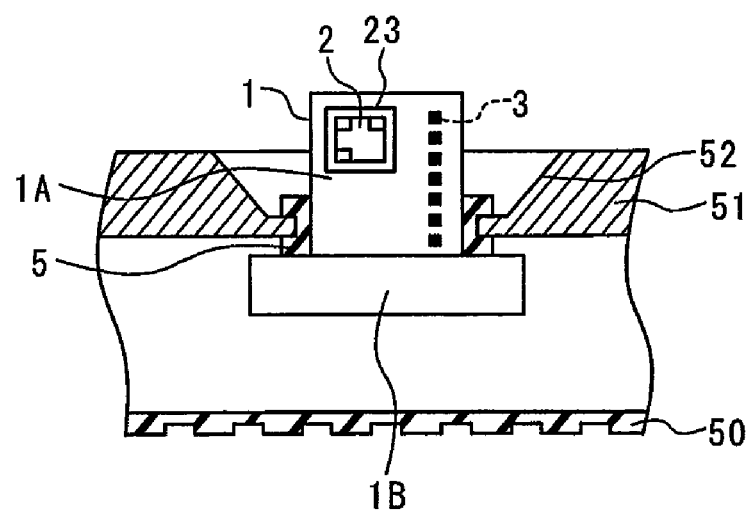
FIG. 14 is a diagram showing a fourth modification of the pressure measuring module according to the first embodiment.

FIG. 13 is a diagram showing another modification of the pressure measuring module according to the present embodiment.

An IC tag 21 storing the module ID of the pressure measuring module 1 is embedded in the antenna unit 1A of the pressure measuring module 1 shown in FIG. 13. The IC tag 21 is located to ensure that the reader 61 of the position setting device 6 can read the module ID from the external, similarly to the identification code 2. As the reader 61 of the position setting device in this case, an IC tag reader capable of reading the module ID from the IC tag 21 is used.

Since the IC tag 21 is used, the module ID can be read even when the surface of the antenna unit 1A is damaged due to collision with a foreign object such as a stone. This can avoid the situation where the module ID cannot be read, unlike the case where the identification code 2 is used.

When the identification code 2 is used, it is preferable that a transparent protective seal 23 be attached to the identification code 2 to prevent a code portion of the identification code 2 from being damaged. When the protective seal 23 is attached to the identification code 2, it is possible to reduce the possibility that the identification code 2 is damaged.

In the abovementioned example, the pressure monitoring device 8 wirelessly transmits the vehicle ID, and the position setting device 6 receives the vehicle ID from the pressure monitoring device 8. The position setting device 6, however, may receive the vehicle ID in the following manner.

Figure 15:
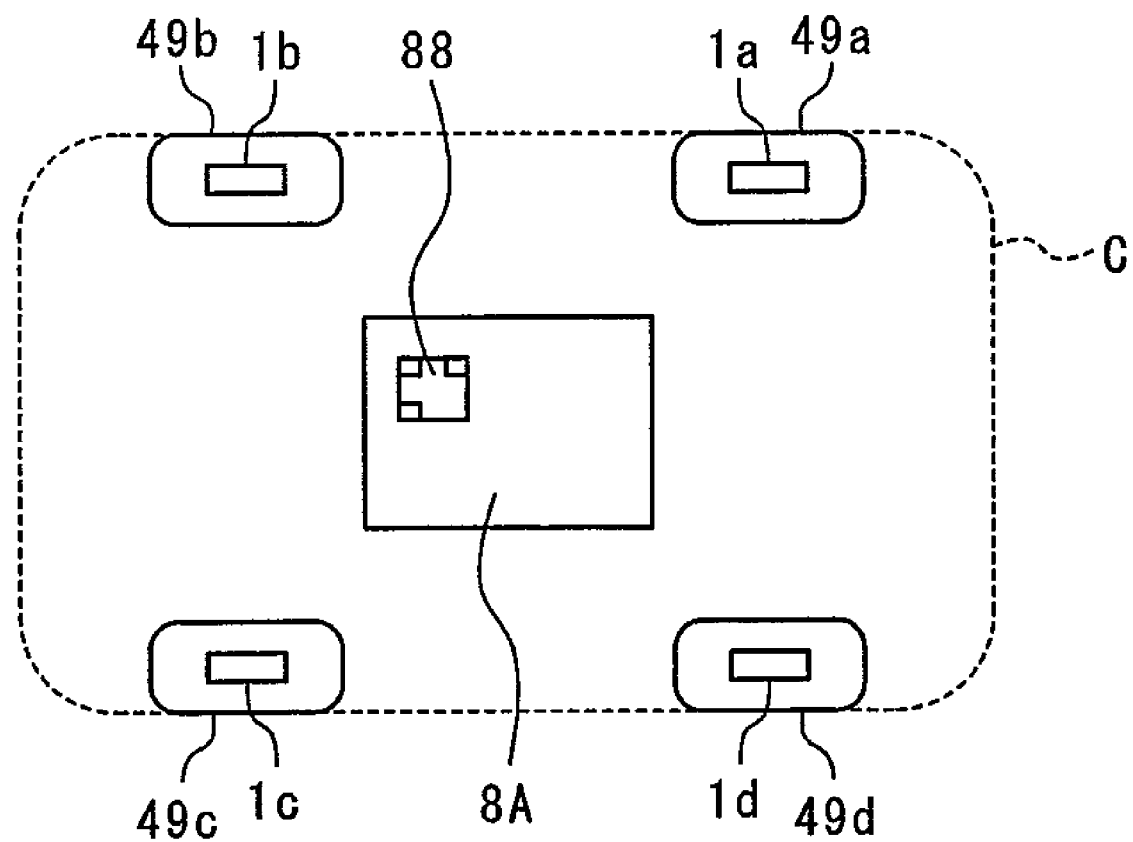
FIG. 15 is a diagram showing a modification of the pressure monitoring device according to the first embodiment.
Figure 16:
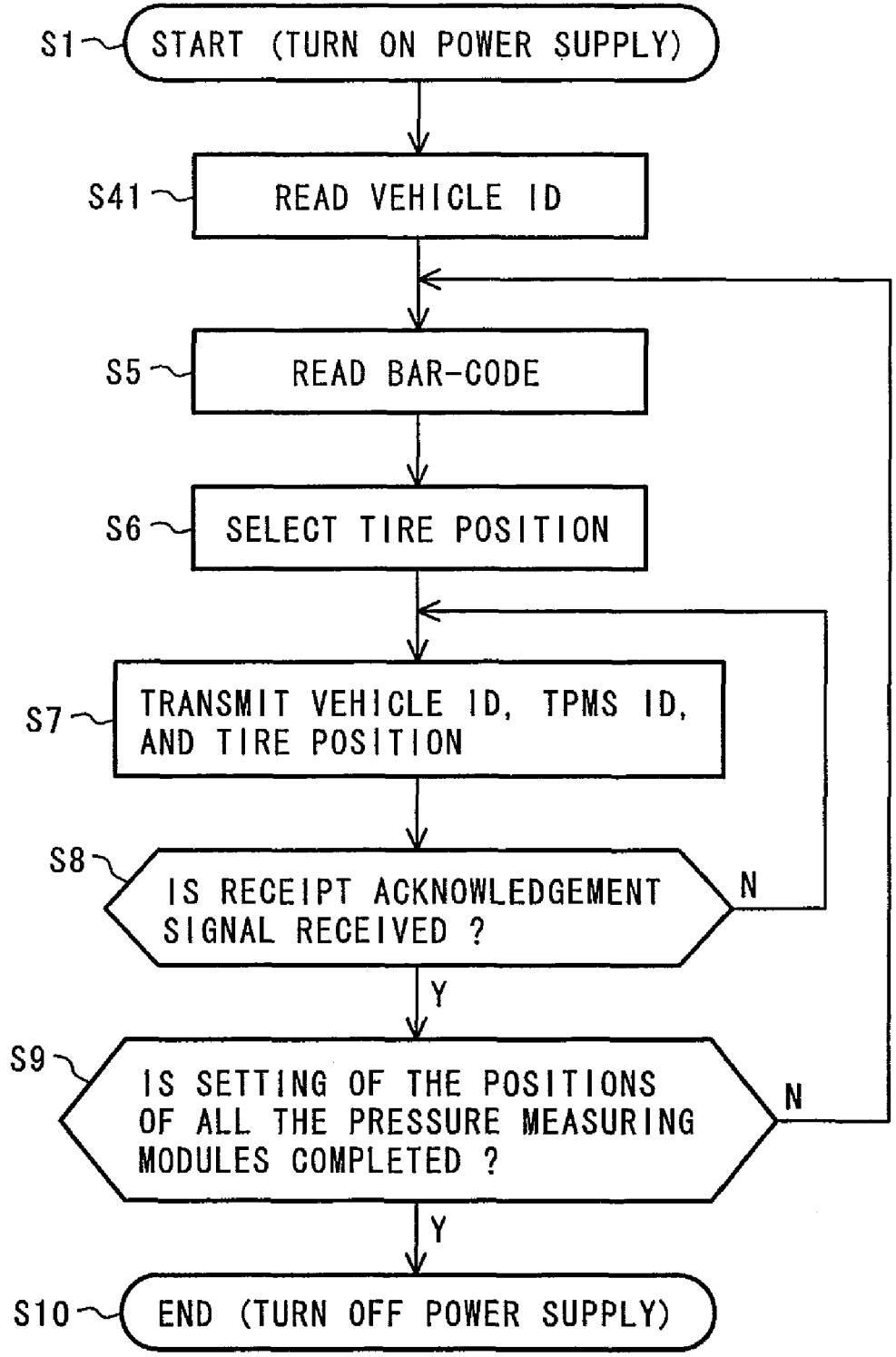
FIG. 16 is a flowchart showing an example of a process of setting the position of the pressure measuring module in the case where the pressure monitoring device shown in FIG. 15 is used.

FIG. 15 is a diagram showing a modification of the pressure monitoring device according to the present embodiment. FIG. 16 is a flowchart showing a process of setting the position of the pressure measuring module 1 in the case where the pressure monitoring device shown in FIG. 15 is used.

An identification code 88 indicating the vehicle ID is attached to the pressure monitoring device 8A shown in FIG. 15. It is preferable that the identification code 88 be located to ensure that the identification code 88 can be viewed from the outside of the vehicle. The identification code 88 may be attached to the vehicle body C. In addition, an IC tag may be used in place of the identification code 88, similarly to the example shown in FIG. 13.

In the process shown in FIG. 16, the position setting device 6 first reads the identification code 88 indicating the vehicle ID in step S41. The process shown in FIG. 16 is different in this point from the process shown in FIG. 9. Since the vehicle ID is read, steps S2 (of transmitting a trigger signal) to S4 (of selecting a vehicle ID) can be replaced with step S41 (of reading a vehicle ID). Therefore, the process can be simplified.

Figure 17:
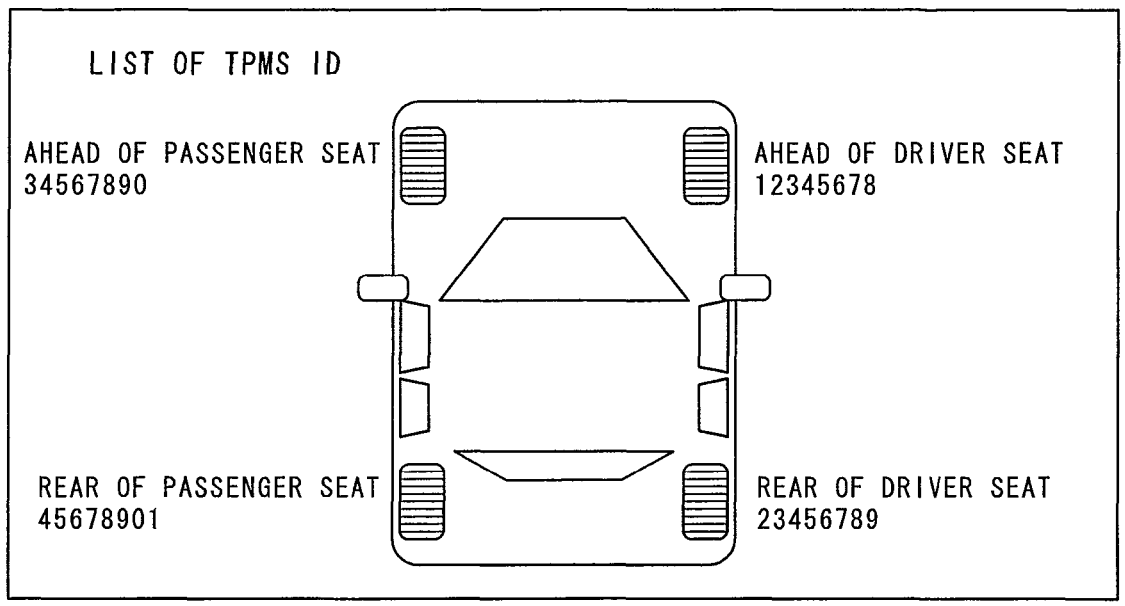
FIG. 17 is a diagram showing the state where a setting state of a module ID of each wheel assembly is displayed by a display unit of a car navigation system.

In the example shown in FIG. 9, the pressure monitoring device 8 uses the receipt acknowledgement signal to inform the position setting device 6 of the reception of data. Instead of the receipt acknowledgement signal, the vehicle may generate a confirmation sound to indicate the reception of data. When the confirmation sound is used instead of the receipt acknowledgement signal, it is not necessary to provide the transmitting circuit 84 of the pressure monitoring device 8 and the receiving circuit 66 of the position setting device 6. Therefore, the weight of the vehicle and the cost for building the system can be reduced. The module ID of the pressure measuring module 1 attached to each wheel assembly may be displayed by a display unit of a car navigation system provided in the vehicle body C simultaneously with the confirmation sound, and the pressure monitoring system may be configured to ensure that an operator can confirm that the module IDs are properly registered in the pressure monitoring device 8. FIG. 17 is a diagram showing the state where a setting state of the module ID of each wheel assembly 49 is displayed by the display unit of the car navigation system. In the example shown in FIG. 17, numbers displayed under words indicating the positions of the wheel assemblies 49 correspond to the module IDs of the pressure measuring modules 1 attached to the wheel assemblies 49, respectively.

Next, a second embodiment of the present invention will be described.

The feature of the second embodiment is that it is possible to set the position of each pressure measuring module 1 without use of the position setting device 6 that is a dedicated terminal. The basic configuration in the second embodiment is the same as that in the first embodiment. Only points different from the first embodiment will be described.

Figure 18:
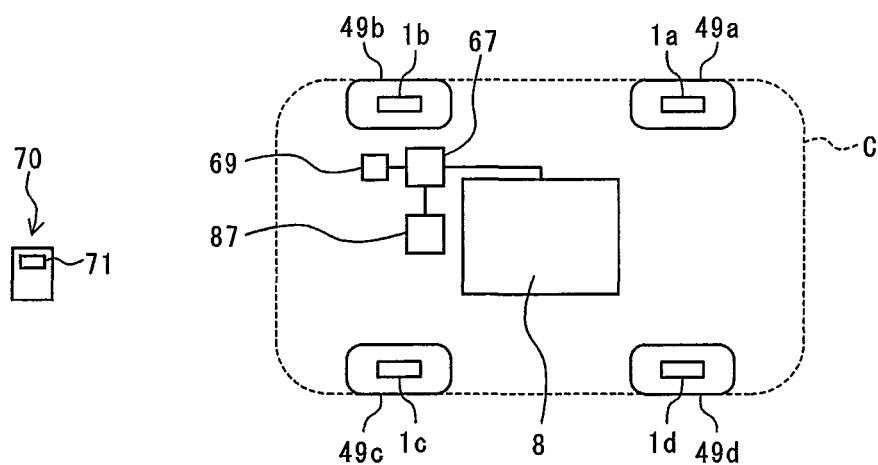
FIG. 18 is a schematic diagram showing a tire pressure monitoring system according to a second embodiment of the present invention.

FIG. 18 is a schematic diagram showing a tire pressure monitoring system according to the second embodiment of the present invention.

The tire pressure monitoring system shown in FIG. 18 has an identification information display device 70, a position setting device 67 and a display unit 87.

The identification information display device 70 is a commercially available terminal having a reader 71 capable of reading the module ID of each pressure measuring module 1 from the identification code 2 attached to each pressure measuring module 1. The identification information display device 70 displays the module ID read by the reader 71 to ensure that an operator of the device 70 can view the displayed module ID. The operator uses the identification information display device 70 to obtain the module ID of the pressure measuring module 1 attached to each wheel assembly 49.

A cellular phone having a camera with a function capable of reading a barcode may be used as the identification information display device 70. When the cellular phone is used as the identification information display device 70, the identification code 2 may be read by downloading a dedicated application for reading the identification code 2 and starting the downloaded application. In addition to the cellular phone, a commercially available terminal having a function capable of reading the module ID stored in a barcode, an IC tag or the like may be used as the identification information display device 70.

The position setting device 67 receives data on the pressure value of the air within the tire 50 from each pressure measuring module 1. In addition, the position setting device 67 receives the module ID wirelessly transmitted by each pressure measuring module 1. The position setting device 67 sets the position of the pressure measuring module 1 having the received module ID. The position setting device 67 is mounted on the vehicle body C and connected with the pressure monitoring device 8 through a wired line. The position setting device 67 has an input unit 69 and is connected with the display unit 87.

The input unit 69 is used by the operator to enter information on the position of each pressure measuring module 1 based on the module ID (of the pressure measuring module 1) acquired through the identification information display device 70. The input unit 69 is mounted on the vehicle body C. The positional information entered by means of the input unit 69 is registered in the position setting device 67 and associated with the module ID by the position setting device 67. The position setting device 67 then transmits the positional information and the module ID to the pressure monitoring device 8.

The display unit 87 displays a screen (position setting screen) for setting the position of each pressure measuring module 1. The display unit 87 is mounted on the vehicle body C. The display unit 87 receives data required for the positional setting screen from the position setting device 67. The display unit 87 according to the present embodiment is also used as a display unit for a car navigation system in order to simplify the configuration. The input unit 69 may use a touch panel display unit for the car navigation system.

Figure 19A:
FIGS. 19A and 19B are diagrams each showing a screen of a display unit according to the second embodiment.
Figure 19B:

FIGS. 19A and 19B are diagrams each showing a screen displayed by the display unit 87. FIG. 19A shows the screen for selecting any of the pressure measuring modules 1 in order to set the position of the pressure measuring module 1. FIG. 19B shows the screen for setting the position of the selected pressure measuring module 1.

Each of the display screens includes a message display section 9a, a module ID selection section 9b and a module position selection section 9c.

The message display section 9a displays to the operator a message related to a method for operating the input unit 69.

The module ID selection section 9b displays the module ID received by the position setting device 6. The operator uses the input unit 69 to change the module ID displayed in the module ID selection section 9b and select the module ID of any of the pressure measuring modules 1 in order to set the position of the pressure measuring module 1. When the module ID is selected, the screen shown in FIG. 19A is changed to the screen shown in FIG. 19B. In consideration of the situation where another vehicle is placed in the neighborhood, it is preferable to estimate the distance between the pressure monitoring device 8 and each pressure measuring module 1 based on the intensities of the received radio waves, and display each module ID in the module ID selection section 9b in the order of the pressure measuring modules 1 from the pressure measuring module 1 closest to the pressure monitoring device 8 to the pressure measuring module 1 farthest from the pressure monitoring device 8. This makes it easier to select the pressure measuring module 1.

The module position selection section 9c displays a candidate for the position of the wheel assembly to which the pressure measuring module 1 is attached. The operator uses the input unit 69 to change the position displayed in the module position selection section 9c and select the position of the wheel assembly to which the pressure measuring module 1 is attached.

Figure 20:
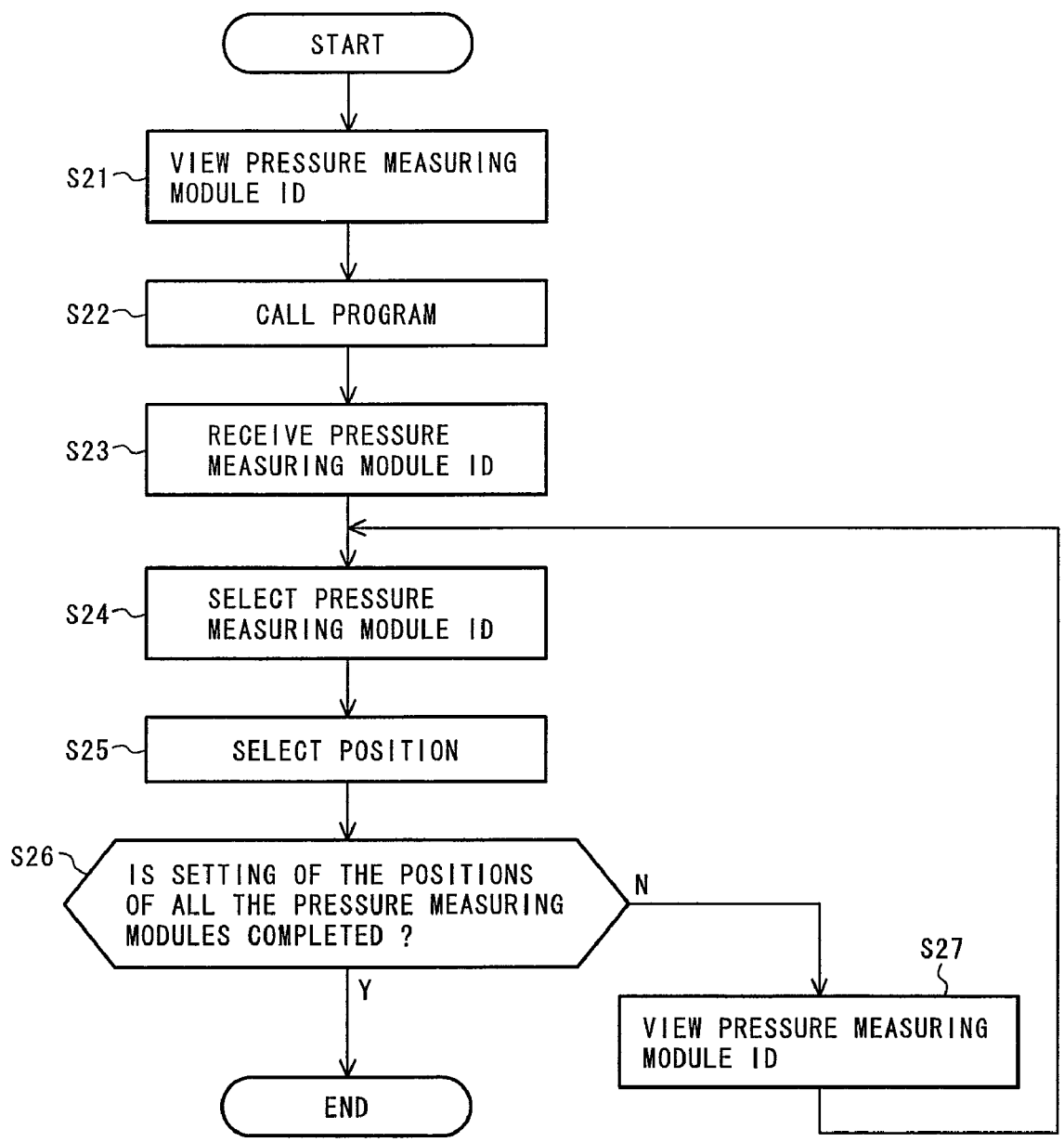
FIG. 20 is a flowchart showing an example of a process of setting the position of the pressure measuring module according to the second embodiment.

FIG. 20 is a flowchart showing a process of setting the position of each pressure measuring module 1 according to the present embodiment.

In the process of setting the position of each pressure measuring module 1, the operator uses the identification information display device 70 to view the module ID of the pressure measuring module 1 of which the position needs to be set in step S21. The operator then uses the input unit 69 to call a program for setting the position of the pressure measuring module 1 in step S22. When the program starts, the position setting device 67 receives data (module ID and tire pressure) that is periodically transmitted from each pressure measuring module 1 in step S23. Before the operator calls the setting program in step S22, the program may be run as background processing, and the position setting device 67 may receive the module ID from each pressure measuring module 1 and store the module IDs therein.

Next, the operator uses the input unit 69 to select, from the module ID selection section 9b, the module ID of the pressure measuring module 1 of which the position needs to be set in step S24. The operator then selects, from the module position selection section 9c, the position of the selected pressure measuring module 1 and set the selected position in step S25. When it is necessary that the position of another one of pressure measuring modules 1 be set, the operator uses the input unit 69 to view the module ID in step S27 in the same way as step S21, and the process returns back to step S24. When setting of the positions of all the pressure measuring modules 1 is completed in step S26, the process is ended. The module ID and position of each pressure measuring module 1 are registered in the pressure monitoring device 8 by the position setting device 67 through the process shown in FIG. 20.

In the tire pressure monitoring system according to the present embodiment, the position of each pressure measuring module 1 can be set without use of the position setting device 6 used in the first embodiment. A user who does not have the position setting device 6 (that is a dedicated terminal) can reset the position of each pressure measuring module 1 when the wheel assembly is replaced.

The identification information display device 70 is used to obtain the module IDs in the above description. When a person replaces the wheel assembly of a certain vehicle with another one, the number of vehicles placed near the certain vehicle is small in many cases. Several digits (for example, the last two digits) or characters of the identification code 2 may be described in the pressure measuring module 1, and the position of the pressure measuring module 1 may be set based on the description. In this method, a device for reading the module ID is not required. Therefore, the system can be easily built.

Although the pressure monitoring device 8 and the position setting device 67 are separated from each other, the pressure monitoring device 8 and the position setting device 67 may be integrated with each other. When the identification information display device 70 has a wireless communication function such as a Bluetooth communication function, the identification information display device 70 may wirelessly transmit the module ID of each pressure measuring module 1 and the information on the position of each pressure measuring module 1 and use the method shown in FIG. 9 according to the first embodiment to set the position of each pressure measuring module 1.

What is claimed is:

1. A pressure measuring module for detecting pressure of air within a tire included in a wheel assembly attached to a vehicle body and wirelessly transmitting data indicating the detected pressure and information on an identification of the pressure measuring module to a pressure monitoring device mounted on the vehicle body, the pressure measuring module comprising:
an antenna that has a portion protruding from the surface of a wheel included in the wheel assembly through a through-hole communicating with an inner space of the tire, and wirelessly transmits the data indicating the detected pressure and the identification information to the pressure monitoring device; and
an identifier that is viewable from the outside of the wheel assembly and indicates the identification information.

2. The pressure measuring module according to claim 1, wherein
the through-hole is located at a bottom surface of a recessed portion formed in the surface of the wheel.

3. The pressure measuring module according to claim 2, that is fixed to the wheel to ensure that an end portion of the pressure measuring module, which is on the side of the wheel, is provided in the recessed portion.

4. The pressure measuring module according to claim 2, wherein
the recessed portion has a mortar shape to ensure that the diameter of the recessed portion closer to the through-hole is reduced.

5. The pressure measuring module according to claim 1, wherein
the identifier is attached to the surface of the pressure measuring module and is a code obtained by coding the information on the identification of the pressure measuring module.

6. The pressure measuring module according to claim 1, wherein
the identifier is embedded in the pressure measuring module and is an IC tag storing the information on the identification of the pressure measuring module.

7. A tire pressure monitoring system for monitoring pressure of air within a tire included in a wheel assembly attached to a vehicle body, the tire pressure monitoring system comprising:
- a wheel that is included in the wheel assembly and has a surface at which a through-hole communicating with an inner space of the tire is provided;
- a pressure measuring module that is inserted in the through-hole, has a pressure detector for detecting a pressure of air within the tire included in the wheel assembly, and wirelessly transmits information on an identification of the pressure measuring module and the pressure data detected by the pressure detector;
- an identifier that indicates the information on the identification of the pressure measuring module and is attached to the pressure measuring module to ensure that the identifier is viewable from the outside of the wheel assembly;
- a position setting device that has a reader for reading the information on the identification of the pressure measuring module, and an input unit adapted to enter the information on the position of the pressure measuring module with respect to the vehicle body, and wirelessly transmits the identification information read by the reader and the positional information entered by means of the input unit; and
- a pressure monitoring device that is mounted on the vehicle body, has the identification information transmitted from the position setting device and the positional information transmitted from the position setting device stored therein, uses the stored identification information, the stored positional information, the identification information transmitted from the pressure measuring module and the pressure data transmitted from the pressure measuring module, associates the pressure data with the positional information based on the identification information, and monitors the pressure.

8. The tire pressure monitoring system according to claim 7, wherein
the pressure monitoring device wirelessly transmits information on an identification of the vehicle body to the position setting device, and
the position setting device transmits, to the pressure monitoring device, the information that indicates the identification of the vehicle body and is transmitted from the pressure monitoring device, the information that indicates the identification of the pressure measuring module and is read by the reader, and the positional information entered by means of the input unit, after the pressure monitoring device wirelessly transmits the information on the identification of the vehicle body.

9. The tire pressure monitoring system according to claim 7, wherein
the frequency of a radio wave wirelessly transmitted by the pressure measuring module is the same as the frequency of a radio wave wirelessly transmitted by the position setting device.

10. The tire pressure monitoring system according to claim 7, wherein
the through-hole is provided at a bottom surface of a recessed portion formed in the surface of the wheel.

11. The tire pressure monitoring system according to claim 10, wherein
the pressure measuring module is attached to the wheel to ensure that an end portion of the pressure measuring module, which is located on the side of the wheel, is provided in the recessed portion.

12. The tire pressure monitoring system according to claim 10, wherein
the recessed portion has a mortar shape to ensure that the diameter of the recessed portion closer to the through-hole is reduced.

13. The tire pressure monitoring system according to claim 7, wherein
the identifier is attached to the surface of the pressure measuring module and a code obtained by coding the information on the identification of the pressure measuring module, and
the reader is a code reader for reading the information on the identification of the pressure measuring module from. the code.

14. The tire pressure monitoring system according to claim 7, wherein
the identifier is embedded in the pressure measuring module and is an IC tag storing the information on the identification of the pressure measuring module, and
the reader is an IC tag reader for reading the information on the identification of the pressure measuring module from the IC tag.

15. A tire pressure monitoring system for monitoring pressure of air within a tire included in a wheel assembly attached to a vehicle body, the tire pressure monitoring system comprising:
- a wheel that is included in the wheel assembly and has a surface at which a through-hole communicating with an inner space of the tire is provided;
- a pressure measuring module that is inserted in the through-hole, has a pressure detector for detecting a pressure of air within the tire included in the wheel assembly, and wirelessly transmits information on an identification of the pressure measuring module and the pressure data detected by the pressure detector;
- an identifier that indicates the information on the identification of the pressure measuring module and is attached to the pressure measuring module to ensure that the identifier is viewable from the outside of the wheel assembly;
- an identification information display device that has a reader for reading information on an identification of the pressure measuring module from the identifier and displays the identification information read by the reader;
- a position setting device that is mounted on the vehicle body, has an input unit used by an operator to enter information on the position of the position setting device with respect to the vehicle body based on the identification information displayed by the identification information display device, and transmits the information on the identification of the pressure measuring module and the positional information entered by means of the input unit through a wired line; and
- a pressure monitoring device that is mounted on the vehicle body, has the identification information and the positional information stored therein, uses the stored identification information, the stored positional information, the identification information wirelessly transmitted by the pressure measuring module, and the pressure data wirelessly transmitted by the pressure measuring module, associates the pressure data with the positional information based on the information on the identification of the pressure measuring module, and monitors the pressure.

16. The tire pressure monitoring system according to claim 15, wherein the identification information display device is a cellular phone.

17. The tire pressure monitoring system according to claim 16, wherein
the through-hole is provided at a bottom surface of a recessed portion formed in the surface of the wheel.

18. The tire pressure monitoring system according to claim 16, wherein
the identifier is attached to the surface of the pressure measuring module and a code obtained by coding the information on the identification of the pressure measuring module, and the reader is a code reader for reading the information on the identification of the pressure measuring module from the code.

19. The tire pressure monitoring system according to claim 16, wherein
the identifier is embedded in the pressure measuring module and is an IC tag storing the information on the identification of the pressure measuring module, and the reader is an IC tag reader for reading the information on the identification of the pressure measuring module from the IC tag.

* * * * *